May 4, 1926. 1,583,126

N. CRANE

LEAKAGE TIGHT JOINT

Filed Dec. 26, 1924

Inventor
Newton Crane
by Wright, Brown, Quinby & May
Att'ys.

Patented May 4, 1926.

1,583,126

UNITED STATES PATENT OFFICE.

NEWTON CRANE, OF BOSTON, MASSACHUSETTS, ASSIGNOR TO WALWORTH-ENGLISH-FLETT COMPANY, OF BOSTON, MASSACHUSETTS, A CORPORATION OF MASSACHUSETTS.

LEAKAGE-TIGHT JOINT.

Application filed December 26, 1924. Serial No. 758,080.

*To all whom it may concern:*

Be it known that I, NEWTON CRANE, a citizen of the United States, residing at Boston, in the county of Suffolk and State of Massachusetts, have invented new and useful Improvements in Leakage-Tight Joints, of which the following is a specification.

The present invention relates to packings for joints between pipes or in other conduits or containers in which fluids may be confined under high pressures. Within the meaning of the term "containers" I include closed vessels in which it may be desired to confine fluid upon, or in, which high pressures may be imposed or generated, as well as conduits.

The object of the invention is to provide a packing or joint capable of being made tight so as to prevent leakage of fluid, whether such fluid is liquid or gaseous, from the high pressure side to the low pressure side of the joint, even though the pressure difference may be of an order of magnitude amounting to many thousands of pounds per square inch. This object is accomplished by the use of a packing member of sufficiently hard and tough material to be itself not subject to flow under the fluid pressures encountered in the use of the joint, such packing member being of a special form and set into grooves, also of special form, in the members of the joint, combined with coupling means adapted to close the members of the joint together and capable of exerting such great and uniformly distributed force through said members upon the packing member as to cause flow of the latter into conformity with certain parts of the grooves in which it is received. The characteristics of the joint are more particularly explained in the following specification, in connection with a drawing illustrating one embodiment of the invention with a modification in a detail thereof.

In the drawings.

Like reference characters designate the same parts wherever they occur in all the figures.

The members $a$ and $b$ represent two pipe sections forming part of a conduit. In the broader view they typify any two parts of a container, such as a closed receptacle and its cover, or any conduit in which fluid under pressure is to be confined. Hence, although in the following description I may refer to these members as pipes or pipe sections, the claims are to be construed according to this broader view. Since the leakage-tight joint between the two members is the important subject matter of the invention, the character in other respects of the members $a$ and $b$ themselves is relatively unimportant.

Figure 1:
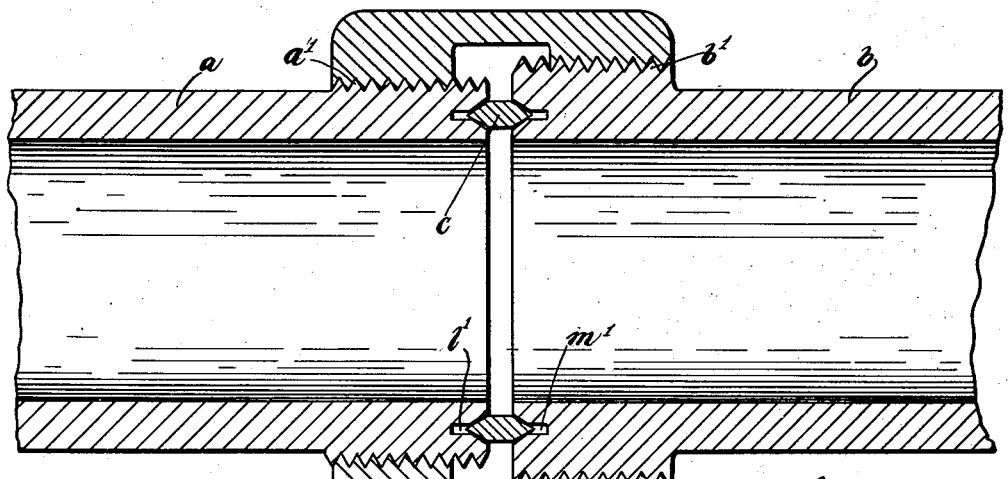
Figure 1 is a longitudinal section of a joint between two lengths of a pipe, such joint containing the principles of this invention.
Figure 2:
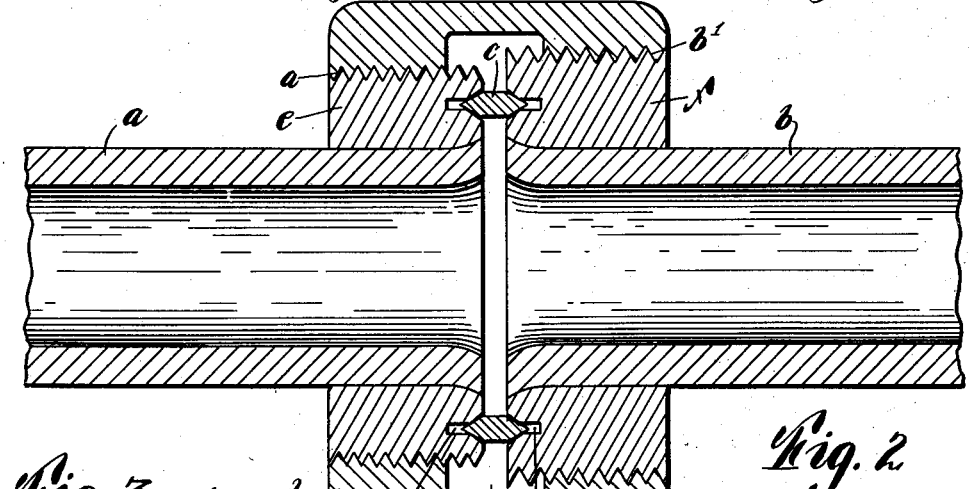
Fig. 2 is a similar view of a like joint containing a modification in details of construction.
Figure 3:
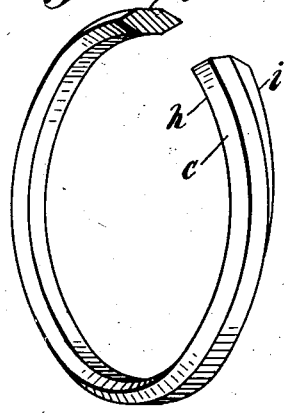
Fig. 3 is a perspective view of the packing ring which forms one of the elements of the complete joint.
Figure 4:
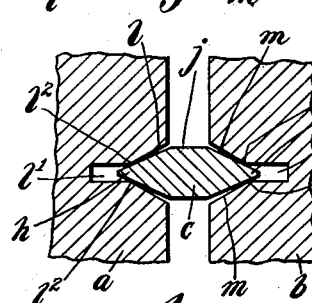
Fig. 4 is a fragmentary sectional view on an enlarged scale of the members of my novel joint, illustrating the characteristic features thereof.

Proceeding with the detailed description of the embodiment of the invention here illustrated, the pipe sections $a$ and $b$ are arranged end to end, and between them is placed a packing ring $c$, while they are connected to one another, and drawn or pressed together, by a threaded coupling ring or nut $d$. In the species shown in Figure 1 the ends of the pipe sections are thickened by upsetting sufficiently to provide the necessary material for cutting the screw threads with which the coupling nut engages, while in the form shown in Figure 2 the threads are cut upon rings or collars $e$ and $f$ suitably secured to the pipe sections. Said collars or rings may be so secured by being shrunk on the ends of the pipe sections and the latter expanded into bevels in the collars, or they may be welded or brazed to the pipes, or attached in any other manner which affords sufficient security.

The threaded part of one of the pipes, whether formed on the thickened end of the pipe itself or on a collar, is of larger diameter than the threaded part of the other pipe; so much so that the root of its thread is of larger diameter than the top of the thread on the other pipe; and the latter thread is of larger diameter at its root than the pipe itself. Thus the coupling nut, which is internally threaded in complement to the threads of the pipe section, may be passed over the end of the pipe having the threads of less diameter, in this case the pipe $a$, and then withdrawn entirely clear of the other pipe. An internal chamber $g$ is formed in the middle part of the coupling ring of larger diameter than the largest thread and of sufficient length to permit extensive rotation of the ring without interference of its smaller end with the threads on the pipe $b$ (that is, the pipe having the thread of larger diameter).

The threads on the two pipe sections have respectively different pitches; that is, one of them has a greater number of turns per unit of length than the other. In this case it is the thread $a'$ on the pipe $a$ or on its collar $e$ which has the finer pitch, and the thread $b'$ on the pipe $b$, or on its collar $f$ which has the coarser pitch. Thus when the coupling nut is turned so as to screw it off from the pipe $a$ and upon the pipe $b$, it draws the pipes together with an effect equal to that of a thread of which the pitch is the product of the pitches of threads $a'$ and $b'$. To illustrate, in one specific design which I have made, in which the external diameters of the threads approximate seven and one-half inches, I have made the thread $a'$ with a pitch of one-eighth of an inch, and the pitch of thread $b'$ with a pitch of one-seventh of an inch. This makes the closing effect of the coupling ring $d$ equivalent to a screw having fifty-six threads to the inch, and enables great pressure to be exerted on the packing ring, while the threads are large enough to have ample strength. In other words, the amount by which the joint is taken up is the differential of the threads upon the two pipe sections, and this differential may be of any value desired; without sacrifice of strength in the threads, whereby enormous powers may be developed in compression upon the packing ring. And as the coupling is a nut completely encircling the pipe sections, this force is exerted equally at all points upon the packing ring. This last is an important factor in making a joint which is leakage-tight at all points under high pressures.

As the pipes and other containers are intended to withstand pressures of great magnitude, for instance superheated steam at a pressure of twelve hundred pounds per square inch, or other fluids in which even greater pressures may be imposed from some source or generated by heat, the pipe sections $a$ and $b$, or equivalent members, and the coupling ring, are necessarily made of a material and in dimensions capable of withstanding such pressures. I prefer to make them of steel having high tensile strength. The packing ring on the other hand is of softer material than the members $a$ and $b$ (or $e$ and $f$) but at the same time hard and rigid enough not to flow under the pressures exerted upon it by the fluid. I may make the packing ring of soft iron for pressures of the highest magnitudes, but may use materials of a somewhat more ductile quality as brass or copper, to serve conditions where the pressures are lower.

The formation of the packing ring and of the grooves in the other members of the joint in which it is set, is a vital factor of the invention. As will be observed from the drawings, the packing ring is beveled at both ends $h$ and $i$, not necessarily to a sharp edge, but to a width or thickness less than that of the bottoms of the grooves in which it is set, as will be presently explained. At its central zone $j$ it is preferably cylindrical, both externally and internally, although this is a characteristic in which some modification is possible. Its form in cross section is solid, by which I mean that it has no interior grooves or re-entrant angles capable of permitting its beveled sides to spring toward one another; and in composition it is substantially non-elastic and non-resilient. In the adjacent ends of the pipe sections, or in the collars $e$ and $f$ applied on said sections, are grooves $l$ and $m$ which approximately match the beveled ends of the packing ring, but preferably do not exactly match them, at their entrances, but at their bottoms $l'$ and $m'$ are extended beyond the ends of the ring and have a width greater than the tapered extremities $h$ and $i$ thereof. The included angle between the flaring sides of the grooves $l$ and $m$ is less than ninety degrees, but preferably slightly greater than the included angle between the sides of the beveled ends of the ring. Thus between the flaring sides of the grooves and the narrow extensions thereof are formed angles $l^2$, $l^2$ and $m^2$, $m^2$ on which the beveled sides of the packing ring seat, and between which and the ring the first contact takes place when the joint is put together.

In assembling the joint the sections $a$ and $b$ are brought together with the packing ring $c$ between them, after the coupling nut has first been applied to the section $a$ and screwed back clear of the section $b$. Then the coupling nut is screwed outward and engaged with the threads of both sections. If, owing to the differential threads, it begins to bind before it has been engaged fully enough with the threads, such binding can be relieved by turning the section $a$ backward. When the nut is properly engaged with both sections, it is turned, with the effect of forcing the sections together, until the joint is tight. Under the great closing pressure thereby exerted between the two sections $a$ and $b$, the packing ring is forced into tight engagement with the seating angles $l^2$, $l^2$ and $m^2$, $m^2$, and is caused to flow and change its form until it conforms to the flaring sides of the grooves $l$ and $m$. It is further extruded into the narrow extensions $l'$ and $m'$ of said grooves. Such deformation and extrusion insures a contact between the packing ring and the walls of the grooves sufficiently tight to prevent leakage. I do not mean to imply that the packing ring is extruded so far as to fill the groove extensions, or at all nearly to do so, for that is not necessary or desired; but simply that such extensions provide spaces into which the ends of the ring may be extruded far enough to cause its sides to conform exactly with the seating angles and with the flaring sides of the grooves for a sufficient distance outside of such angles, without requiring any considerable upsetting or thickening of the ring to take place. Inaccuracies in the form or finish of the ring are obliterated by the local deformation of the ring thus effected; such local deformation being made possible and inevitable by the fact that the ring is not springy or resilient either in composition or structure. I have used a packing having the characteristics here described to withstand a pressure difference of approximately seventy thousand pounds per square inch between the interior and exterior of the container without any leakage occurring.

In achieving this result the extrusion of the ends of the packing ring into the groove extensions is an important factor; and to obtain this action it is necessary that such groove extension should be provided, of a width greater than the extremities of the packing ring, and that the flaring sides of the grooves should be of such an angle as will direct the flow of the ring into these extensions rather than transversely between the ends of the coupled members $a$ and $b$. For this reason I make the included angle between the flaring sides of the grooves less than ninety degrees, and preferably about sixty degrees, with the opposite sides of the groove approximately symmetrical in respect to the direction in which pressure is applied. Then in order to insure contact of the packing ring first with the seating shoulders $l^2$, $l^2$ and $m^2$, $m^2$, the included angle of the beveled ends of the ring is made approximately fifty-eight degrees, that is slightly less than the included angle of the groove, and also symmetrical with respect to the direction of closing pressure. Thus, under the great pressure applied in closing together the parts of the joint, the packing ring is made to conform to the bearing contact shoulders of the grooves, and to the adjacent surfaces for sufficient distances outward therefrom, thus conforming to all minute irregularities and imperfections of the grooves, and thus leaving no passageway, however minute, through which fluids under the high pressures here in contemplation can flow. Any metal softer than the steel of which the members $a$ and $b$ are preferably made, will flow in the manner described and under the pressure exerted by means of the coupling nut, but the ring must be of a strength and hardness such that it will not flow under the pressures exerted by the fluid and so permit the fluid to open a passage for its escape.

What I claim and desire to secure by Letters Patent is:

1. A container for fluid under high pressure comprising separate members of hardness and rigidity substantially as great as steel arranged adjacent to one another and having coaxial grooves in their opposed surfaces, a packing ring of substantially non-resilient metal and construction and softer than said members but having strength and hardness at least as great as that of copper, said ring having beveled ends, and each of said grooves being beveled with a wider included angle than that of the adjacent beveled end of the ring, and having also a bottom extension of greater width than the extremity of the ring; said ring being adapted to enter the said grooves and to seat on the angles between the beveled sides and the bottom extensions of the respective grooves; and means for forcing the said separate members toward one another with pressure sufficient to distort the ring into exact conformity with said angles and with the beveled surfaces of said grooves next adjacent to said angles.

2. A container for high pressure comprising separate members of relatively hard metal arranged adjacent to one another with opposed annular surfaces, said surfaces having coaxial grooves equal in diameter to one another with beveled sides and bottom extensions, the sides of which extensions form distinct angles with said beveled sides, a packing ring having beveled ends adapted to enter the grooves of both of said members, each extremity of said ring being narrower than the space between the angles of the groove in which it enters, and the included angle between its beveled sides being less than the angle between the beveled sides of the same groove, the ring having a solid cross section and being composed of non-resilient metal of a hardness at least as great as copper, but less hard than the said members, whereby it is locally deformable under pressure applied upon it by and through the angles of said grooves, and means for forcing the said members toward one another and against the interposed ring with sufficient force to deform the beveled sides of said ring into conformity with the angles of the respective grooves, and to a progressive extent with the beveled surfaces of the grooves extending away from said angles.

3. A container for fluid under pressure comprising two separate members arranged adjacent to one another and having opposed annular surfaces in each of which is a groove coaxial and of substantially equal diameter with a similar groove in the other, the said members being externally threaded with threads of respectively different pitches, a coupling nut having differential threads complemental respectively to the threads of said members, and a packing ring interposed between said members and entering at its opposite ends the respective grooves therein; the said members being steel and the ring being made of a metal softer than steel but substantially equal in hardness to a soft iron, both the said grooves and the ends of the ring which enter said grooves having beveled sides and the grooves having bottom extensions wider than the extremities of the rings, the sides of which extensions make distinct angles with the beveled sides of the respective grooves, and said beveled sides of the grooves including a wider angle than that between the beveled sides of the ring.

In testimony whereof I have affixed my signature.

NEWTON CRANE.